Oct. 13, 1959  G. LAUER  2,908,389
GRADING AND DISTRIBUTING APPARATUS
Filed Jan. 3, 1956  3 Sheets-Sheet 2
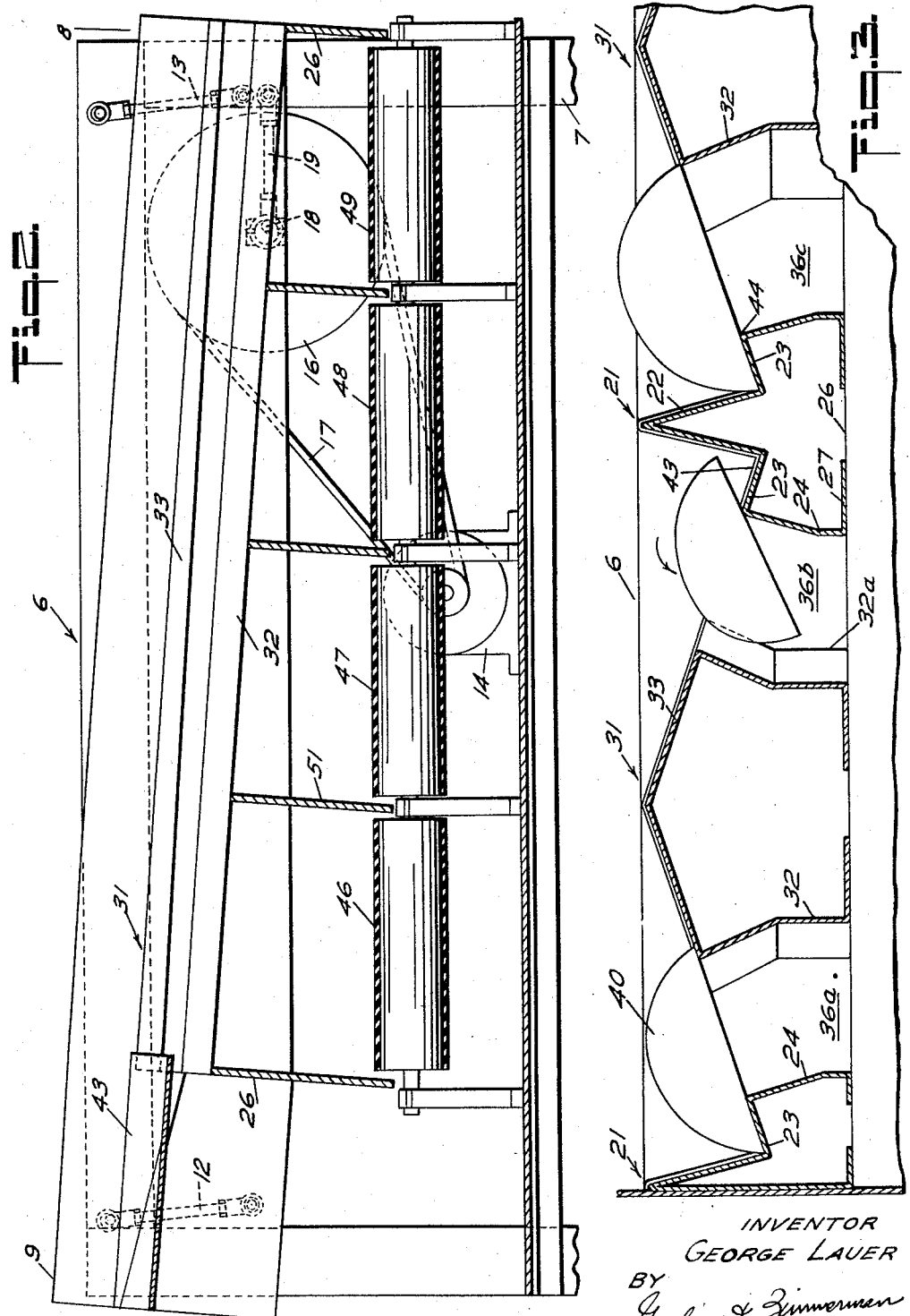
INVENTOR
GEORGE LAUER
BY
Gardner & Zimmerman
ATTORNEYS Oct. 13, 1959 G. LAUER 2,908,389
GRADING AND DISTRIBUTING APPARATUS
Filed Jan. 3, 1956 3 Sheets-Sheet 3

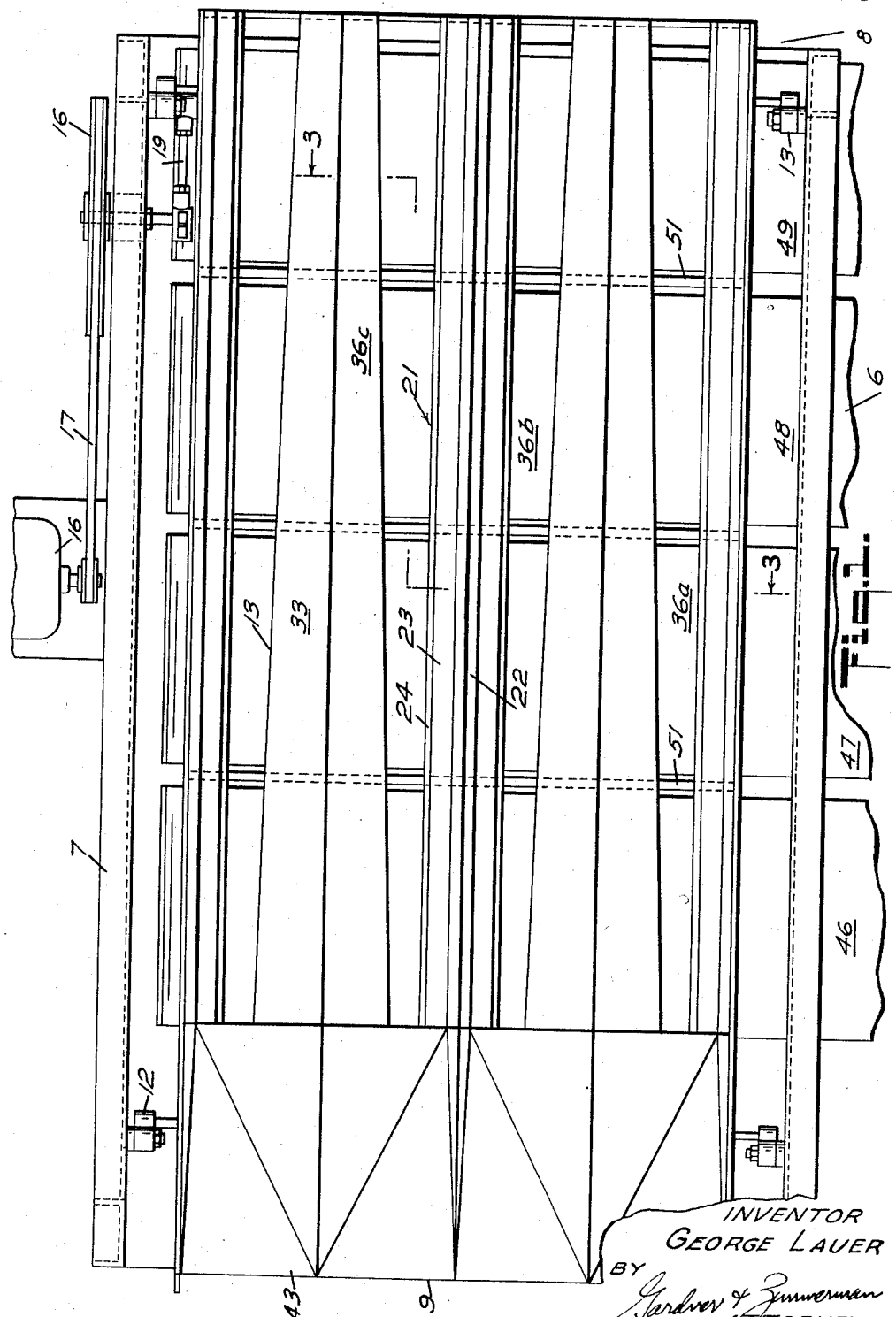

INVENTOR
GEORGE LAUER
BY
ATTORNEYS

United States Patent Office 2,908,389
Patented Oct. 13, 1959

2,908,389

GRADING AND DISTRIBUTING APPARATUS

George Lauer, Oakland, Calif.

Application January 3, 1956, Serial No. 557,162

7 Claims. (Cl. 209—99)

This invention relates generally to grading apparatus, and is more specifically directed towards apparatus for grading halved fruit according to the diameter of the fruit.

In many instances, fruit such as apricots, peaches or the like are halved and pitted prior to being canned, and it is important to grade and separate the fruit according to the fruit size. It is accordingly an object of the present invention to provide apparatus for receiving a plurality of articles of different sizes, and sequentially discharging articles of selected sizes as the articles pass along the apparatus.

Another object of the invention is to provide apparatus of the character described which is arranged to receive halved fruit in a cut face down position and move the fruit along the length of the apparatus while permitting constantly increasing sizes of fruit to be discharged onto conveyors, boxes or other receiving means positioned subjacent the apparatus.

A further object of the invention is to provide a fruit grading apparatus in which diverging slot means are provided so as to permit fruit of increasing size to pass through such means at various locations along the length thereof, but in which means are provided for preventing the danger of the fruit becoming wedged or jammed in said means.

Another object of the invention is to provide apparatus of the character described in which the fruit halves are positively supported on diametrically opposed portions of the cut surface thereof until the fruit is completely free to fall through a slot positioned between the fruit supports.

Another object of the invention is to provide grading apparatus including means for supporting the halved fruit on diametrically opposed portions of the cut surface thereof, then moving the fruit until one of the supporting portions is withdrawn, thereby effecting a pivotal movement of the fruit about an edge of the other support so as to permit the fruit to freely fall through the slot between the supports.

A still further object of the invention is to provide a modified arrangement of slot, wherein the opposed supports for the fruit are maintained at an equal spacing from each other for a predetermined longitudinal distance, and then are progressively spaced further apart, whereby a predetermined range of fruit sizes may fall through the slot along each of the steps thereof.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings:

Figure 1 is a top plan view of the apparatus of the present invention.

Figure 2 is a longitudinal cross-sectional view of the structure shown in Figure 1.

Figure 3 is a transverse cross-sectional view taken substantially in the planes indicated by line 3—3 of Figure 1.

Figure 4:
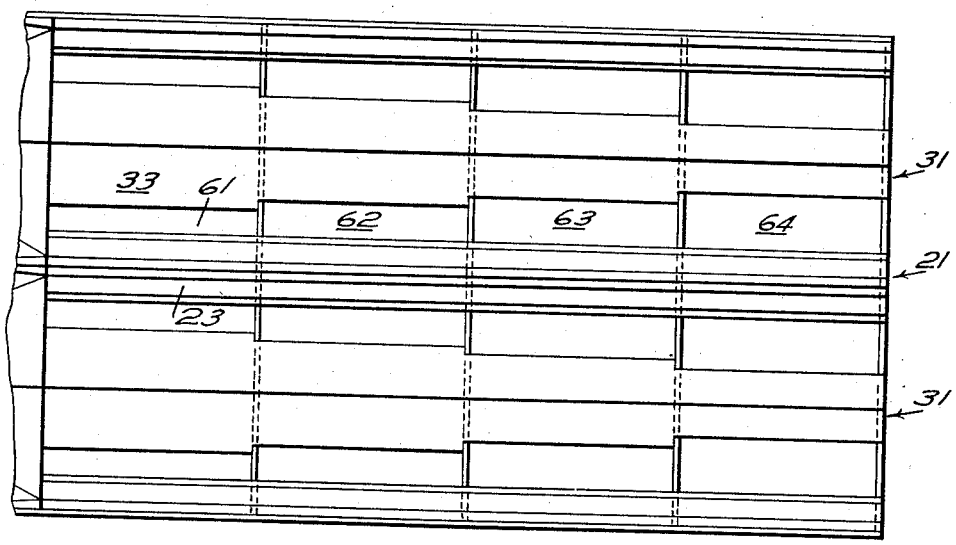
Figure 4 is a top plan view of a modified form of the invention.

As hereinabove explained, the apparatus of the present invention is specifically arranged to receive a quantity of halved fruit, such as peaches, apricots or the like, at one end thereof, move the fruit along the length of the apparatus, and cause fruit of particular sizes to pass from the apparatus onto conveyors or the like at selected points of travel longitudinally of the apparatus. More specifically, the fruit halves are carefully supported over a slot of changing width, the supports being arranged to engage the lower surface of opposed diametrical portions of the fruit halves so that as one of the supporting surfaces is withdrawn, the fruit half will remain supported primarily by the other surface until a complete withdrawal of the first support, at which time the peach half will rock about the second support edge and fall downwardly through the slot.

The foregoing is carried out by the apparatus as shown in the drawings, and reference will first be made to the arrangement disclosed in Figures 1 to 3 thereof. As shown in these figures, a fruit grading table, generally indicated by the numeral 6, is provided, such table being of any desired length and width, and is carried on any suitable frame work 7. The table 6 is preferably inclined downwardly towards the discharge end 8 and means are provided for advancing the fruit halves from the receiving end 9 to the discharge end. This means consists of a mechanism for longitudinally shaking or oscillating the table and may be effected by supporting the table on links 12 at the forward or receiving end thereof and similar links 13 adjacent the discharge end. The oscillatory movement is imparted by means of an electric motor 14 which is connected to the table by means of a pulley 16 driven by motor 14 through a belt 17, the pulley being provided with an eccentric cam arm 18 and link 19 which is pivotally connected to the table. In this manner, when the motor is in operation, the table will move on the pivoted link structure and the oscillatory motion will be imparted by means of the eccentric crank arm. Thus, the fruit halves or other objects will travel along the downwardly inclined table surface from the receiving to the discharge end of the apparatus, and it is during this course of travel that means are provided for discharging selected sizes of the objects during the course of movement.

In operation, the receiving end of the apparatus is adapted to receive the fruit halves in a cut face down position from any suitable supply source, distributor means being provided at the receiving end for maintaining the fruit halves in such position and guiding them in a plurality of files along the defined paths for the halves. As here shown, extending longitudinally of the apparatus are a plurality of parallel guides, generally indicated by the numeral 21. These guides are best illustrated in Figure 3 of the drawings and in cross-section will be seen to include an upper triangular portion 22 and base portions 23 extending laterally outwardly and slightly upwardly from the lower surface of the triangular portion. Then, extending downwardly from the bases 23 are side walls 24 which may be secured to suitable cross members 26 at the ends of the table by means of inwardly directed flanges 27 or the like. The walls of the triangular portion 22 and the respective intersecting walls of the bases 23 form an included angle of close to 90 degrees, and it is important to note that each of the bases extend upwardly from a horizontal plane at an angle in the general range of 10 to 25 degrees. The purpose of this angular disposition will be hereinafter explained.

Positioned intermediate each pair of guides 21 are auxiliary guides, generally designated by the numeral 31. Guides 31 likewise extend longitudinally of the apparatus and in cross-section are provided with side walls 32 in parallel spaced relationship to the side walls 24 and a flat triangular upper surface 33 which, as will be noted in Figure 3 lie in the same general plane as the adjacent base portion 23. However, by virtue of the spacing between the walls 24 and 32, a plurality of slots 36a, 36b, 36c, etc., will be provided between the laterally opposed wall portions of the guides 21 and 31. It is through these slots that the fruit halves 40 are adapted to pass according to the fruit size.

The guides 31 are of constantly decreasing cross-sectional form, and diverge or taper from the receiving end to the discharge end of the apparatus. However, such taper is only across the width of the guide and does not affect the height thereof or disturb the coplanar relationship between the supporting surfaces 23 and 33. Thus, at the receiving end of the table, the walls 32 will extend to the position indicated at 32a in Figurue 3 and as the guide continues towards the discharge end, it gradually diminishes in cross-sectional size with a resulting increase in slot width. In this manner, fruit passing along the table and supported on the guides will be confronted with a constantly increasing slot size, and thereby smaller fruit will be initially discharged through the slot adjacent the receiving end of the apparatus, the largest size fruit will be retained on the table surface until it approaches the larger slot width adjacent the discharge end of the apparatus, and fruit halves of medium size will pass through the slot intermediate the table ends.

If the fruit halves were merely supported on a flat table with a gradually diverging slot provided in the surface thereof, the fruit would move into the slot as soon as any portion of the fruit could be inserted. With such an arrangement, not only would the fruit jam in the slot, but even if sufficient shaking was effected to cause the fruit to pass completely through the slot, the meat of the fruit could be seriously damaged. However, by virtue of the guide arrangements as above discussed the foregoing difficulties have been completely obviated. Again referring to Figure 3 of the drawing, it will be seen that the fruit halves are initially supported over the respective slots in cut face down relationship with one portion of the fruit being supported on the base portion 23 of guide 21 and a diametrically opposed portion of the fruit being supported on one of the surfaces 33 of guide 31. The fruit may be readily moved into such position by providing an apron 43 at the receiving end of the table, such apron having a configuration corresponding to that of the respective guides but completely overlying the slots adjacent the receiving end of the table. Thus, considering the action of a fruit half in its movement along the table it will be appreciated that the peach will initially assume the position indicated over the slot 36a of Figure 3, the minimum width of the slot being sufficient to support even the smallest fruit halves on their diametrically opposed flattened portions. Due to the slope of the surfaces 23 and 33, the fruit will gravitally move laterally against the walls of the triangular guide portion 22 and be retained in such position as the fruit is caused to move longitudinally along the table. Then, by virtue of the fact that the wall 32 and supporting surface 33 is gradually receding away from surface 23, and the slot width is increasing, a condition will be reached similar to that shown by the right hand fruit half overlying the slot 36c, at which time the wall 32 has receded to such a point that the fruit is, for all practical purposes momentarily supported solely on the guide portion 23. This guide portion has a minimum width so that the center of gravity of even the smallest fruit half will extend beyond the edge 44 of the guide. Then, by virtue of the resulting movement of the fruit half as the wall 32 continues its recession relative to wall 24, the fruit half will commence rotating about the edge 44 as indicated by the fruit overlying the slot 36b At this time, there is nothing to interfere with continued rotation of the fruit half, as the wall 32 is disposed in normal relationship to the supporting surface 33 and therefore is even further withdrawn from the path of movement of the rocking fruit half. As the fruit freely falls through the slot, there may be provided a plurality of conveyor belts such as indicated at 46, 47, 48 and 49, which extend generally transversely to the longitudinal axis of the table and which are arranged to receive and carry away fruit of various sizes after the same has fallen through the respective slots. Suitable deflector plates 51 may be utilized between adjacent conveyors to prevent intermingling of fruit after the same has been discharged and passed from the table.

In Figure 4 a slightly modified form of arrangement is disclosed in which the guides 21 are positioned in the same manner as previously discussed, but in which the guides 31, instead of being of constantly decreasing cross-sectional form, continue with a constant width for a predetermined length, and then abruptly decrease in width at periodic points along the table. In this manner, there is initially provided a slot 61 between the guides 21 and 31 which is of constant width, then a larger slot 62, 63 and 64, or any desired number may thereafter be provided. In this manner, fruit halves of a particular size will fall through the slot substantially immediately upon entering the slot of wider width. However, the same result will be obtained in that the peach half will be initially supported on diametrically opposed portions, and then suddenly one of such portions will be withdrawn whereby the fruit, in which the center of gravity overlies the slot at all times, will pivot about the corner 44 of the guide 21 and drop through the slot onto the subjacent conveyors or other mechanism which may be positioned subjacent the table.

What is claimed is:

1. Apparatus for grading halved fruit comprising a longitudinally extending table, means for longitudinally oscillating said table whereby fruit halves deposited at one end thereof will move towards the other end thereof, said table having a longitudinally extending guide member provided with an upstanding wall portion and a support portion inclined upwardly from said wall portion and from a horizontal plane in a direction transverse to the longitudinal axis of said table, said table further having a supporting surface in spaced relation to said first support portion so as to define a slot therebetween, said supporting surface and support portion being in generally coplanar relationship for supporting an object over said slot, said supporting surface being laterally spaced from said support portion at various distances along the length of said table whereby said slot width changes along said table length.

2. Apparatus as set forth in claim 1 in which said supporting surface recedes laterally and generally uniformly away from said support portion from the receiving end of said table whereby said slot is of uniformly increasing width, while maintaining the coplanar relationship therebetween.

3. Apparatus as set forth in claim 1 in which said slot width is substantially uniform for a predetermined distance along said table and is increased at selected positions along said table.

4. Apparatus for grading articles by size comprising a longitudinally extending table adapted to receive articles to be graded at one end thereof, means for moving articles along the length of said table from said one end towards the other end thereof, said table extending substantially horizontally between the longitudinal edges thereof and having an upper article-supporting surface provided with a plurality of generally parallel longitudinally extending slots extending therethrough, said slots having a minimum transverse width adjacent said receiving end of the table and a greater transverse width adjacent said other end, portions of said surface on laterally opposed sides of each slot being substantially coplanar and laterally inclined with respect to the longitudinal direction of said table with such inclination between adjacent slots being inclined downwards towards the opposite edges of the table whereby said surface defines a plurality of ridges extending longitudinally of the table between said slots, and said surface further having an upwardly disposed longitudinally extending guide means extending substantially for the length of said slots and positioned adjacent each of the lowermost portion of said surface adjacent each of said slots on the opposite side thereof as its associated ridge for limiting downward lateral movement of an article supported on said surface and positioning said article relative to its adjacent slot.

5. Apparatus as set forth in claim 4 in which each of said guide means is disposed substantially normal to the plane of its adjacent inclined surface and extends upwardly to substantially the height of said ridges.

6. Apparatus as set forth in claim 4 in which the width of said slots are of gradually increasing lateral extent.

7. Apparatus as set forth in claim 4 in which the width of said slots are of progressively increasing but parallel lateral extent.

References Cited in the file of this patent

UNITED STATES PATENTS

| | | |
|---|---|---|
| 663,681 | Nichols | Dec. 11, 1900 |
| 769,567 | Rice | Sept. 6, 1904 |
| 1,190,067 | Zenge et al. | July 4, 1916 |
| 1,245,584 | Hallock | Nov. 6, 1917 |
| 1,305,900 | Harnish | June 3, 1919 |
| 1,918,398 | Johnson | July 18, 1933 |
| 2,501,403 | McKinsey | Mar. 21, 1950 |
| 2,610,724 | Dudley | Sept. 16, 1952 |

FOREIGN PATENTS

| | | |
|---|---|---|
| 5,974 | Great Britain | 1903 |
| 530,795 | Great Britain | Dec. 20, 1940 |
| 592,573 | France | May 2, 1925 |